July 31, 1928.
D. R. COLLIER
WHEEL
Filed Dec. 14, 1923
1,678,669
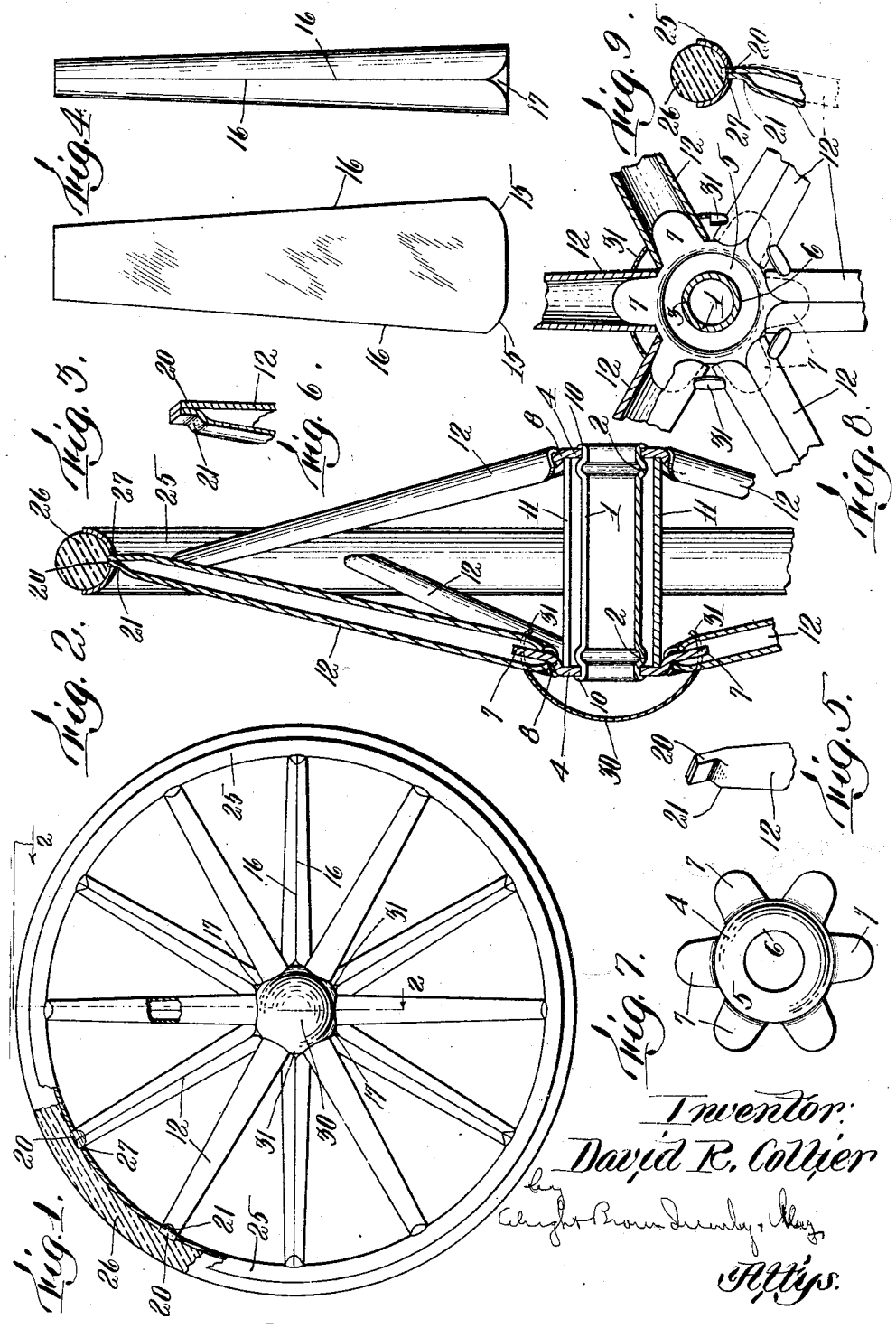
Inventor:
David R. Collier Patented July 31, 1928.

1,678,669

UNITED STATES PATENT OFFICE.

DAVID R. COLLIER, OF GARDNER, MASSACHUSETTS, ASSIGNOR TO COLLIER-KEYWORTH COMPANY, OF GARDNER, MASSACHUSETTS, A CORPORATION OF MASSACHUSETTS.

WHEEL.

Application filed December 14, 1923. Serial No. 680,626.

This invention relates to wheels more particularly intended for small vehicles, such as perambulators, go-carts, children's sulkies, and the like, and provides a sturdy construction of low cost, stronger than wire wheels, and without certain faults of wood "artillery" wheels.

For this purpose each of the spokes is made of sheet metal cut and then bent to tubular form, the inner ends of the spokes engaging over ears projecting radially from disk-shaped hub plates at opposite ends of a tubular axle-receiving or journal member. These spokes project alternately from each of the hub plates to the wheel rim through slots in which they project. The hub plates are held spaced apart by a sleeve placed therebetween and through which the journal member extends and this journal member is headed over on its ends to retain the spokes in position with the hub plates abutting the spacer sleeve. The ends of the spokes are formed with shoulders engaging the inner face of the rim so that when assembled the spokes are under compression between the hub and the rim and are thus firmly held in position.

For a more complete understanding of this invention reference may be had to the accompanying drawings in which—

Figure 1 is a plan partly in section of a wheel constructed according to this invention.

Figure 2 is a section on line 2—2 of Figure 1.

Figure 3 is a view of the blank from which a spoke is formed.

Figure 4 shows a blank rolled to tapered tubular form.

Figures 5 and 6 are fragmentary views illustrating slightly different manners of forming up the outer ends of the spokes.

Figure 7 illustrates a hub plate.

Figure 8 is a fragmentary view partly in section having the spacer sleeve omitted, showing the manner in which the inner ends of the spokes engage the hub plates.

Figure 9 is a sectional detail showing the engagement between the outer end of a spoke and the wheel rim.

The wheel as shown comprises a central tubular axle-receiving or journal member 1 having at its ends outwardly projecting circumferential ribs 2 which may be formed by outwardly pressing the material of this journal member. It may, if desired, be formed of a strip of sheet metal bent to tubular form, the side edges of the strip abutting together as shown at 3 in Figure 8.

Positioned on this journal member outwardly of each rib 2 is a hub plate 4 one of which is shown detached in Figure 7. This plate comprises a disk portion 5 having a central aperture 6 through which the member 1 passes and extending outwardly from the edges of this disk are a series of radially arranged ears 7. These ears are offset inwardly from the plane of the disk portion 5 to form a continuous annular shoulder portion 8 at the margin of the disk portion 5 and at the bases of the ears, and the ears 7 are inclined inwardly so as to project toward the wheel rim for a purpose which will later be described. The extreme ends of the journal member 1 are rolled outwardly and headed or flanged over as shown at 10 to retain the hub plates in position. Surrounding the journal member 1 it is preferable to employ a spacer sleeve 11 against the ends of which the plates 4 engage within the shoulders 8. This sleeve 11 not only furnishes a firm support against which the hub plates engage, but also increases the diameter of the hub of the wheel and imparts an appearance of strength and solidity to the central portion of the wheel.

The ears 7 extending radially from the hub plates are employed to fix the inner ends of the spokes 12. These spokes are shown of tapered tubular form and may be bent up from trapezoidal shaped blanks of sheet material such as is shown in Figure 3. As shown this blank may have its corners at its wider end rounded off as at 15 so that when the side edges 16 thereof are brought into abutting relation as shown in Figure 4, a tapered tubular spoke is formed having at its larger end a V shaped slot 17 with curved edges. The spoke is preferably flattened somewhat so that it is of substantially oval cross section, the edges 16 of the blank being on one of the flatter faces. By flattening the spoke in this manner its larger end may be slipped over one of the ears 7 of a hub plate, the slot 17 being inwardly positioned relative to the wheel, and be retained thereon with a sufficiently tight fit to prevent paint, into which the assembled wheel may be dipped, from readily finding its way to the interior of the spokes where it would be of no value. The slot 17 imparts a finished appearance to the wheel giving a somewhat star-shaped effect when viewed from the end of the wheel as shown clearly in Figure 1.

The outer flat face at the small end of the spoke is pressed sharply toward the opposite face to form an extremity 20 of reduced cross section terminating in a shoulder portion 21, and if desired, this extremity 20 may be bent out of alinement with the axis of the spoke, as shown in Figure 5, so that when in position, as shown in Figure 2, this extremity will lie substantially in the central plane of the wheel rim 25. This wheel rim as shown is of substantially semi-circular cross section, the concave face being outwardly disposed to receive a tire 26 therein. This rim is perforated at intervals as at 27 to receive the ends of the spokes which project thereto alternately from each of the hub plates 4 in circular series, the shoulders 21 of each spoke abutting against the inner face of the rim.

In assembling these parts one of the hub plates may be fixed on the journal member, the spokes assembled thereon extending outwardly radially but inclined inwardly at such an angle to the journal member more acute than in the completed wheel that their outer ends will lie within the inner circumference of the wheel rim. The sleeve 11 may then be placed in position and the opposite hub plate 4 having its spokes assembled thereon may then be placed in position beyond the other end of the journal member and spacing sleeve, but with the outer ends of its spokes projecting between the spokes extending from the other hub plate and each arranged opposite a slot in the wheel rim. Endwise pressure is then exerted between the two hub plates to force them together and to force the second hub plate on to the journal member and against the end of the spacer sleeve 11, this action also causing the outer ends of the spokes to fully enter the slots in the wheel rim as the inner ends of the spokes of the respective hub plates approach each other, so that when the second hub plate is pressed to its final position the shoulders 21 of the spokes engage the wheel rim and the spokes are under compression between the rim and the shoulders 8 of the hub plates and are thus firmly held in position. The end of the journal member projecting through the second hub plate is then rolled over and beaded down against the outer face thereof. The inclined position of the spokes from one of the hub plates before both plates are fixed on the journal member is shown in full lines in Figure 9, while the position of this spoke when the parts are fully assembled is illustrated in dotted lines.

The outer end of the journal member may then be closed off by a cap 30 which may be of substantially dome shape and have fingers 31 projecting between the spokes extending outwardly from one of the hub plates and sufficiently far from the spacer sleeve 11 as to present a pleasing appearance to the finished wheel. These fingers 31 are curved inwardly at their ends in such a manner that when the cap is forced into position axially of the wheel, their inner ends spring behind the inner faces of the spokes and hold the plate firmly in position without further fastening means. This cap 30 may be of sufficient size so that its outer edge as it spans the adjacent spokes form substantially a continuation of the sides of the V shaped slots 17 of the spokes projecting from the opposite hub plate when the wheel is viewed endwise, giving the somewhat star shaped appearance to the head shown in Figure 1.

Having thus described an embodiment of this invention it should be evident that various changes and modifications may be made therein without departing from its spirit or scope as defined by the appended claims.

I claim:

1. A wheel comprising a hub plate consisting of a disk having a series of radially extending ears thereon, and spokes comprising tubular members having their inner ends engageable over said ears.

2. A wheel comprising a hub plate consisting of a disk having a series of radially extending ears offset inwardly to form a shoulder at the bases of said ears, and tubular spokes each having its inner end engageable over one of said ears and resting against said shoulder.

3. A wheel comprising a hub plate consisting of a disk having a series of radially extending ears offset inwardly to form a shoulder at the base of the ears, a wheel rim, and tubular spokes each having its inner end engageable over one of said ears and resting against said shoulder, and its outer end projecting through a slot in said rim, and having a shoulder bearing on the inner face thereof, said rim acting to hold said spokes in engagement with said ears.

4. A wheel comprising a central tubular journal member, a hub plate at each end of said member, a spacing sleeve surrounding said journal member and against the ends of which said hub plates abut, a rim, and spokes extending from each of said hub plates to said rim.

5. A wheel comprising a central tubular journal member, a hub plate at each end of said member comprising a disk having radial ears projecting from the outer edge thereof, a spacing sleeve surrounding said journal member and against the ends of which said hub plates bear, and tubular spokes engaging over the ears of said hub plate at their inner ends.

6. A wheel comprising a central tubular journal member, a hub plate at each end of said member comprising a disk having radial ears projecting from the outer edge thereof and inwardly offset from the plane of said disk to form a shoulder, a spacing sleeve surrounding said journal member and against the ends of which said hub plates bear, and tubular spokes engaging over the ears of said hub plates and having their inner ends seated on said shoulder.

7. A wheel comprising a central tubular journal member having an outwardly projecting circumferential bead adjacent each end, a hub plate comprising a perforated disk engaging over each end of said journal member and engaging one of said beads at its inner face, the outer ends of said journal member being extended and headed over against the outer faces of said disk, a sleeve surrounding said journal member and against the ends of which the inner faces of said hub plates engage, and spokes having their inner ends engaging said disks.

In testimony whereof I have affixed my signature.

DAVID R. COLLIER.